May 4, 1948. W. D. TEAGUE, JR 2,441,088
AIRCRAFT CABIN PRESSURE REGULATING MEANS
Filed Feb. 26, 1944 5 Sheets-Sheet 1
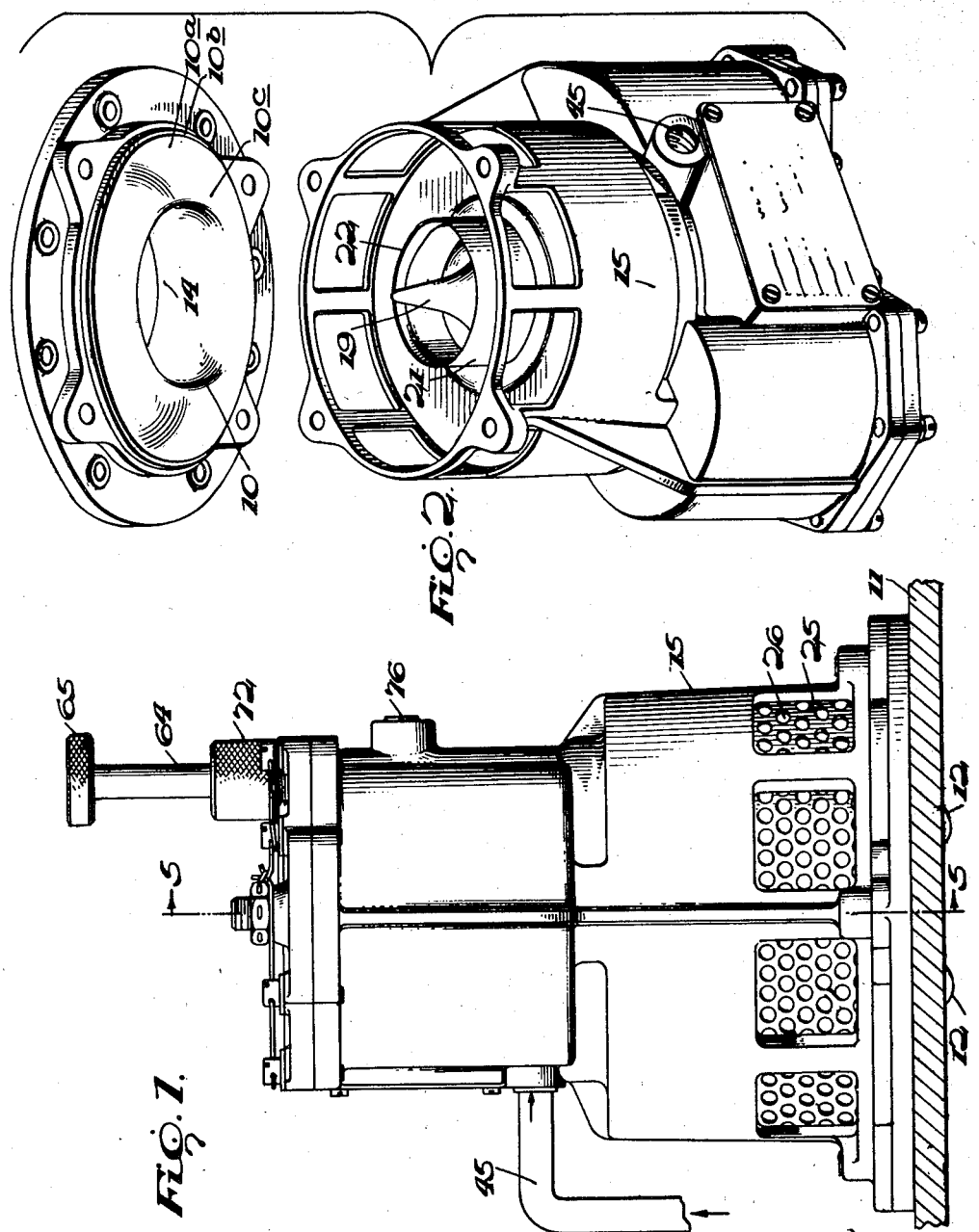
INVENTOR.
Walter D. Teague, Jr.
BY
Herbert L. Davis, Jr.
ATTORNEY INVENTOR.
Walter D. Teague, Jr.
BY
Herbert L. Davis, Jr.
ATTORNEY.

INVENTOR.
Walter D. Teague, Jr.
BY
Herbert L. Davis, Jr.
ATTORNEY

May 4, 1948. W. D. TEAGUE, JR 2,441,088
AIRCRAFT CABIN PRESSURE REGULATING MEANS
Filed Feb. 26, 1944 5 Sheets-Sheet 4

INVENTOR.
Walter D. Teague, Jr.
BY Herbert L. Davis, Jr.
ATTORNEY

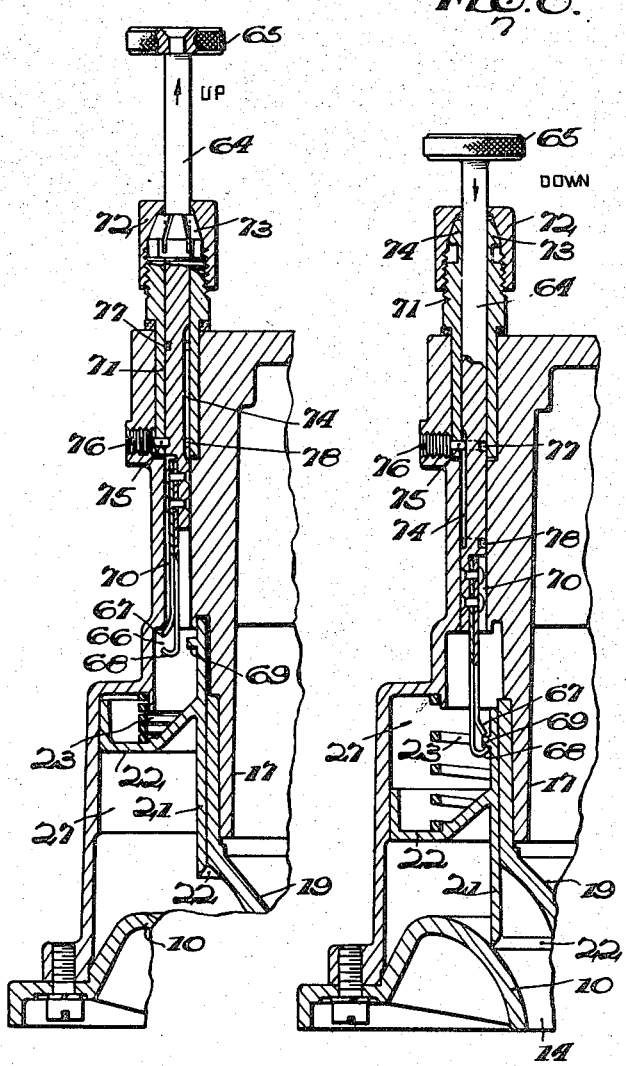

Patented May 4, 1948

2,441,088

UNITED STATES PATENT OFFICE 2,441,088

AIRCRAFT CABIN PRESSURE REGULATING MEANS

Walter D. Teague, Jr., Alpine, N. J., assignor to Bendix Aviation Corporation, Teterboro, N. J., a corporation of Delaware Application February 26, 1944, Serial No. 524,063

13 Claims. (Cl. 98—1.5)

REISSUED
DEC 18 1951
RE 23445

This invention relates to novel and improved control means and methods for maintaining air at suitable pressures in a closed or sealed compartment of an aircraft and more particularly to improvements in an air outlet control mechanism and valve of a type such as shown, for example, in the U. S. Patent No. 2,002,057 to Gregg, dated May 21, 1935, and owned by the assignee of the present invention.

Heretofore there has been employed a form of outlet control having a conoidal sectional valve seating on a venturi as a variable restriction to outlet flow and such valves have in turn been connected by a tube or rod to an air motor piston or control means.

An object of the present invention is to provide an outlet control valve having a nozzle with an area normal to the airstream, progressively decreasing so as to smoothly accelerate the airflow, and arranged as a valve seat for a cylindrical gate valve cooperating therewith, which valve forms a part of an air motor piston.

Another object of my invention is to provide a critical airflow orifice arranged to operate under aircraft conditions without a down stream or recovery cone and having a cylindrical gate valve with a sharp knife-like circular edge provided at one end for engaging the side wall of the orifice for closing the same.

An advantage in the latter form of my cylindrical gate valve is the inherent stability which is secured at the valve, by the knife-like edge acting on the nozzle as a seat. It is apparent from such an arrangement that there is no valve area to speak of in the region of high velocity and hence no tendency to close the valve with increased flow velocity as is true in valves heretofore known in the prior art.

Another object of my invention is to provide novel methods for controlling the pressures within an aircraft cabin so as to maintain predetermined cabin pressures for varying atmospheric pressure conditions.

Another object of my invention is to provide in combination a novel valve for controlling the flow of air from an aircraft cabin, the valve being so arranged that the airflow forces acting upon the same will be relatively small and the same including a piston and a pressure chamber having a bleed orifice therein, whereby the piston may serve as an actuating means for the valve and as a cushioning or dampening means for the air forces acting upon the valve so that accurate adjustment of the valve may be effected without the necessity of a follow-up means.

Another object of my invention is to provide a novel control mechanism, whereby there is provided a control piston open at one side to cabin pressure and a fixed jet communicating between the other side of the control piston and the atmosphere, while an evacuated bellows acted upon by cabin pressure opens and closes a valve controlling a variable orifice so as to open the said other side of the control piston to cabin pressure, the said arrangement including a main spring tension means which acts upon the piston so as to provide proportional regulation between the controlling bellows and the piston.

Another object of my invention is to provide in the aforenoted control mechanism a novel differential control bellows which has provided cabin pressure and atmospheric pressure acting thereon in such a manner as to control a second variable orifice so as to provide a maximum differential control.

Another object of my invention is to so arrange the above control bellows that as the maximum differential between cabin and atmospheric pressure is reached the differential bellows begins automatically to regulate, overpowering the constant pressure control bellows which opens its variable orifice all the way and acts from then on as a fixed jet. Such an arrangement has a decided advantage over the control mechanisms heretofore known, since the differential bellows and its spring may be made as sensitive as required and the amount of maximum differential may be controlled to a close degree with little difference between high and low flow. Here again the bellows may be arranged in direct communication with its variable orifice without a friction increasing interseal.

Another object of my invention is to provide a similar control mechanism whereby a constant ratio between cabin pressure and atmospheric pressure may be obtained and which control is practically identical with the constant differential control with the exception that two concentric bellows are employed, the ratio of their areas determining the maximum ratio.

Another object of my invention is to provide a control mechanism having a minimum of friction and inertia plus proper air dampening which will obviate the necessity for separate follow-up action in the valve. Thus under my present invention there is no need for a separate mechanical linkage or other follow-up arrangement which must necessarily interfere with the accuracy of operation.

Another object of my invention is to provide a control valve, whereby there may be utilized an emergency manual control means by which the pilot or crew member may mechanically set the position of the main valve at any time, and lock the same in such adjusted position so as to thereby permit completion of a mission or flight requiring supercharged cabin operation in the event of failure of the control valve.

A further object of my invention is to provide a control mechanism of the utmost simplicity of construction and operation avoiding the use of wearing parts such as levers, linkages, and sliding seals so as to minimize the possibility of failure in service.

A further object of my invention is to provide a control mechanism which is inherently stable in operation and arranged so that regulation takes place at any altitude and with complete absence from hunting.

The above and further objects and novel features of this invention will more fully appear from the following detailed description and the accompanying drawings wherein like reference characters refer to like parts in the several views. It is to be expressly understood, however, that the drawings are for the purpose of illustration only and are not designed as a definition of the limits of the invention, reference being had for this purpose to the appended claims.

In the drawings:

Figure 1 is an assembled view of my control mechanism showing the same as attached to a cabin wall of an aircraft.

Figure 2 is a perspective view illustrating the control valve and showing in perspective the nozzle detached therefrom.

Figure 7 is a fragmentary sectional view of the emergency manual control showing the same in an inoperative position.

Figure 8 is a fragmentary sectional view similar to Figure 7 with the emergency manual control in operating position.

Figure 9 is a perspective view of the emergency manual control.

Figure 5:
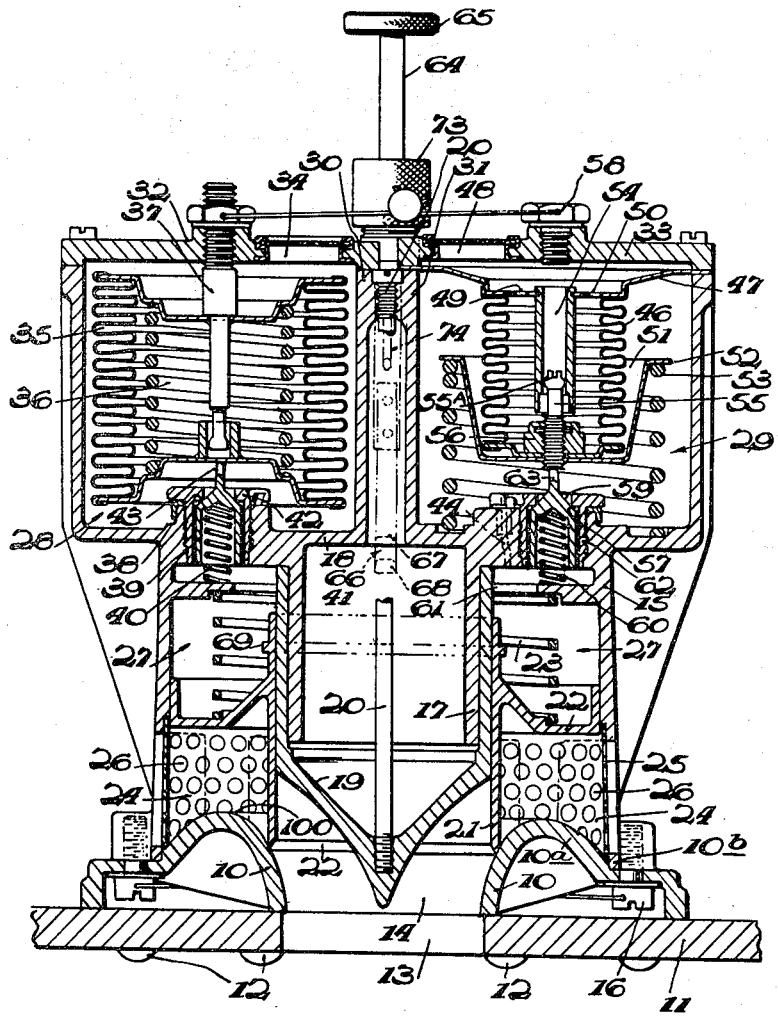
Figure 5 is a sectional view of Figure 1 taken along the lines 5—5 and showing the differential control mechanism.

In Figure 1 the invention is shown in an assembled view as attached to the cabin wall 11 of an aircraft. Air is preferably conducted under pressure into the cabin by a supercharger or other suitable means which may be driven in the conventional manner by an aircraft engine, electrical drive, hydraulic drive, or by a turbo bleed or in any other manner well known in the art. As shown in Figure 5 the nozzle indicated by numeral 10 is attached to the wall of a cabin 11 through suitable bolts 12. An opening 13 may be formed in the wall of the cabin, cooperating with an orifice 14 of the nozzle 10. A casing 15 is attached to the nozzle 10 by the bolts 12 and by other suitable bolts indicated by the numeral 16.

As best indicated in Figure 5 there is provided within the casing 15 a central shaft or stationary plug 17 formed integral with a wall portion 18 of the casing 15 and positioned concentric with the nozzle opening 13. There is affixed at the free end of the shaft 17 a conical shaped member 19, which may be fastened in place by a screw 20.

Figure 6:
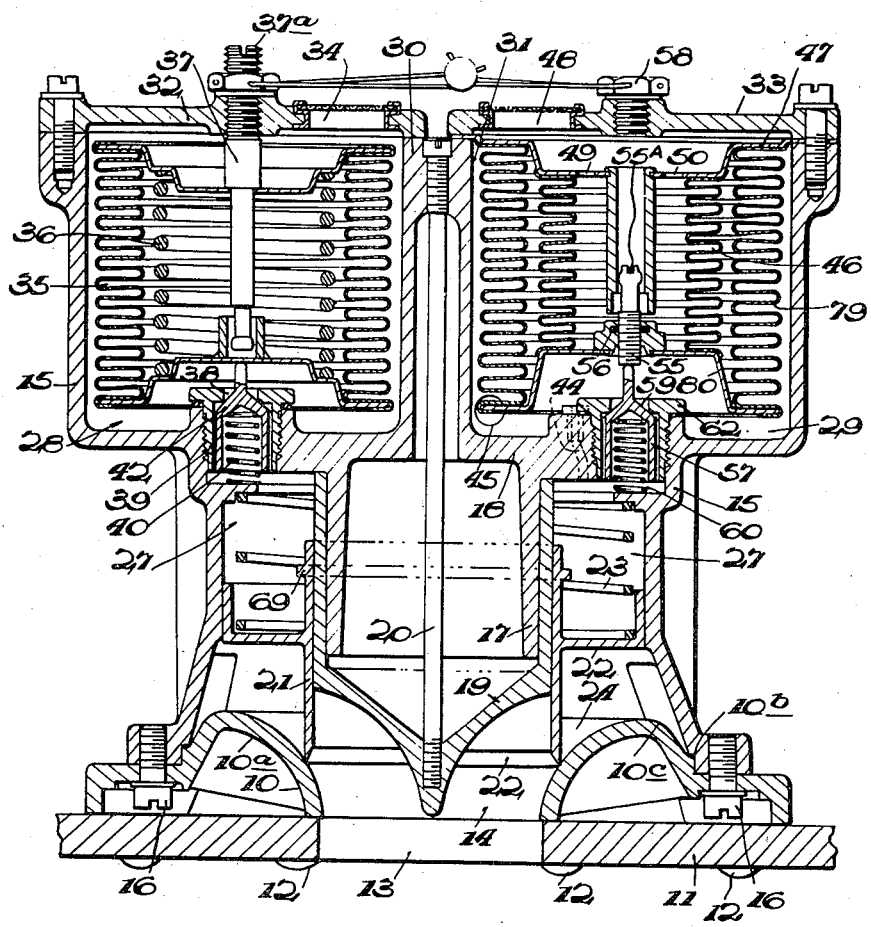
Figure 6 is a sectional view looking in an opposite direction from Figure 5 and illustrating a second form of my invention in which there is shown the constant ratio control mechanism.

As shown in Figures 2, 5 and 6 nozzle 10 includes an annular member 10A having a flared surface which rises progressively from a circumferential edge 10B to a point 10C and then progressively descends into an annular orifice 14 to form a sink-like nozzle. The nozzle surface is designed for the full rated maximum flow of air with the conical shaped member 19 sufficiently spaced from the surface of the nozzle proper for such flow and with the area normal to the stream progressively decreasing from the outer circumferential edge 10B to the inner annular orifice 14 so as to smoothly accelerate the airflow from the circumferential edge 10B into the orifice 14. The surface of the nozzle is so gently curved that the flow does not break away or "burble." Thus the design permits the nozzle to fill or flow full (i. e., the airstream fills the section) so as to pass the maximum amount of air for a given size of nozzle.

Slidably mounted on the member 19 and longitudinally movable thereon is a cylindrical gate valve 21 having a knife-like edge 22 which is adapted to contact the surface of the nozzle 10 at an acute angle so as to control the flow of air from the cabin. Fixed to the cylinder 21 is a piston member 22 which provides a servo motor means for operating the valve 21. A spring 23 is interposed between the piston member 22 and the wall 18 of the casing 15 so as to bias the piston 22 and the cylindrical gate valve 21 in a direction towards the nozzle 10. Between the piston 22 and the nozzle 10 is a chamber indicated by the numeral 24 and defined by the surface of the nozzle 10, piston 22 and the casing 15. Surrounding a portion of the chamber 24 is a screen indicated by the numeral 25 and having formed therein suitable openings 26 leading into the cabin. Thus it will be seen that the pressure within the cabin acting through openings 26 acts upon the piston 22 in a direction opposing the biasing force of the spring 23. At the opposite side of the piston 22 is a second chamber indicated by the numeral 27 and defined by the casing 15, wall 18 and piston 22. The wall 18 has formed therein suitable orifices leading from the cabin to the atmosphere as will be explained.

Figure 3:
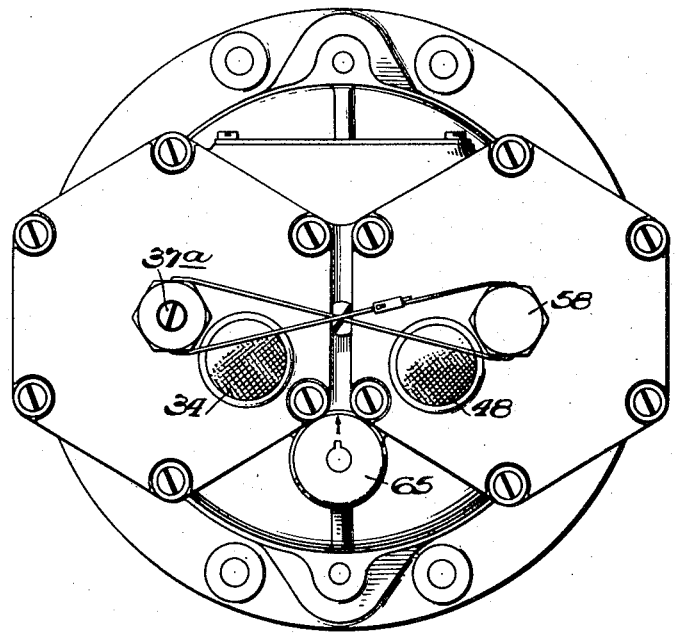
Figure 3 is a top plan view of the control mechanism.
Figure 4:
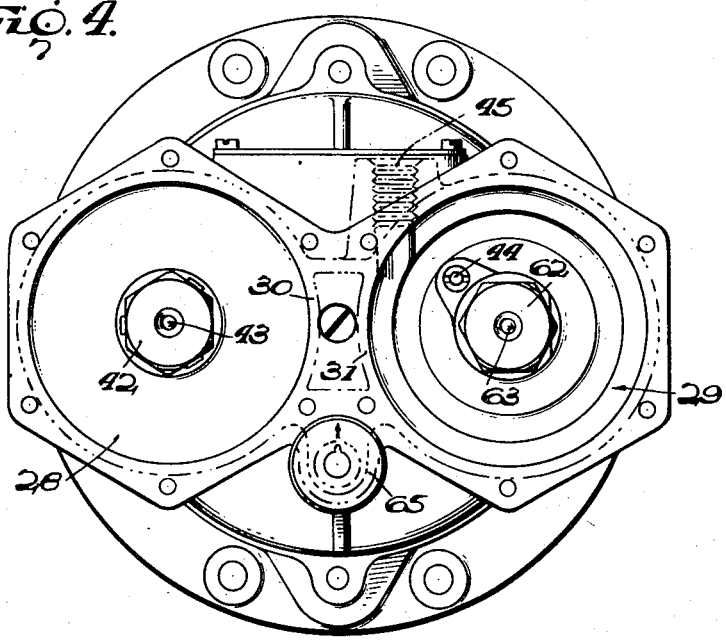
Figure 4 is a plan view of the mechanism with the top covers removed and showing the interior of the pressure chambers of the control bellows.

Formed within the casing 15 are chambers 28 and 29 defined by casing 15, wall 18, walls 30 and 31, and cover plates 32 and 33 fastened to the casing 15 by suitable bolts as indicated in Figures 5 and 6. The chamber 28 opens into the cabin through a suitable screened opening 34 formed in the cover plates 32. Mounted within the chamber 28 is a suitable evacuated bellows indicated by the numeral 35 having a spring 36 biasing the same to an expanded position against the pressure of the cabin. The bellows 35 is suspended with the chamber 28 by an adjustable bolt 37 screw-threadedly engaged in the top member 32. The screw 37 has formed therein a cleft 37A, as shown in Figure 3, whereby the same may be conveniently adjusted by a screw driver or other suitable means from the exterior of the casing for adjusting the position of the bellows 35. An orifice 38 leads from the chamber 28 into the chamber 27. The orifice is controlled by a valve 39, biased into a closed position by a spring 40, held in position by a supporting nut 41 which screw-threadedly engages a second nut 42 mounted in the wall portion 18 and in which is formed the orifice 38. The valve 39 has a projecting part 43 extending into the chamber 28 and arranged for actuation by the bellows 35 upon the expansion thereof in response to a decrease in cabin pressure. Thus upon a predetermined decrease in cabin pressure for which the bellows 35 has been adjusted the same will actuate the valve 39 so as to open the orifice 38 and permit the flow of cabin pressure from the chamber 28 through the orifice 38 into the chamber 27 so as to aid the biasing force exerted by the spring 23 in acting upon the piston 22. Thus the pressure exerted within the chamber 27 acts upon the piston 22 in opposition to cabin pressure acting on the piston at the opposite side thereof at the chamber 24. An orifice or fixed jet indicated by the numeral 44 leads from the chamber 27 into the chamber 29. The latter orifice 44 is open at all times and serves as a bleed from the chamber 27 into the chamber 29. A conduit 45, Figures 1 and 6, leads from the chamber 27 to the atmosphere and may be connected directly to the atmosphere or to the static pressure connection of a suitable pitot tube. Thus air flow from the cabin entering the chamber 27 acts upon the piston 22 and is then bled off through the bleed 44 to the atmosphere. The cabin pressure is continuously applied through the chamber 28 to the piston 22 until the adjustment of the cabin pressure to the desired value has been effected. The bleed 44 is suitably calibrated for the purpose desired.

Mounted within the chamber 29 is a second bellows indicated by the numeral 46 which is suspended in position from a suitable sealing plate 47 which closes the open end of the chamber 29. The sealing plate 47 is held in position by the cover plate 33 in which is formed a suitable screened opening 48. Openings 49 and 50 are formed in the sealing member 47 and lead into the interior of the bellows 46. Thus the interior of the bellows 46 is subject to cabin pressure exerted through the screened opening 48 and openings 49 and 50. The opposite end of the bellows 46 from the plate 47 fits into a cup-like member 51 having a flanged portion 52 engaged by a spring 53. The spring 53 positioned in the chamber 29 between the wall 18 and flange 52 tends to bias the bellows 46 in a direction opposing the cabin pressure acting upon said bellows within the same. A hollow stem 54 carried by the sealing plate 47 is suspended concentrically within the bellows 46 and carries an adjustment screw 55 slidably mounted therein and screw-threadedly engaging a member 56 fastened at the free end of the bellows 46. The adjustment screw 55 projects from the bottom of the cup-like member 51 and is arranged for controlling the operation of a suitable valve 57. The adjustment screw 55 has formed therein a cleft 55A, whereby the same may be conveniently adjusted by a screw driver or other suitable means inserted through a hole provided in the top plate 33 upon removal of a bolt 58 screw-threadedly engaged in the top plate 33. A second orifice 59 leads from the chamber 29 into the chamber 27 and is controlled by the valve 57 which is biased into a closed position by a spring 60 held by a nut 61 screw-threadedly engaged upon a screw 62 in which is formed the orifice 59. The valve 57 has a part 63 operably engaged by the screw 55, whereby the expansion and contraction of the bellows 46 may control the opening and the closing of the valve 57 and thus the flow of the fluid medium within the chamber 27 to the atmosphere through the conduit 45. From the foregoing it will be seen that the bellows 46 is acted upon interiorly by cabin pressure and exteriorly by the biasing force of atmospheric pressure and spring 53. Thus opening of the valve 57 may be effected upon a predetermined differential between cabin and atmospheric pressures.

As shown in Figure 5 the valves 39 and 57 each operate an opening to admit cabin pressure air to or take such air from the chamber 27 of the main piston control 22. In addition the fixed jet 44 of proper calibrated diameter also communicates between the chamber 27 of the main piston control 22 and atmosphere.

From the foregoing it will be readily seen that any sudden fluctuations or changes in the forces acting upon the piston 22 will be accompanied by an air flow at a high velocity through the fixed jet 44 causing a dampening effect upon any change in the position of the cylindrical gate valve 21. Thus piston 22 not only serves as an actuating means for the cylindrical gate valve 21, but also as a cushioning or dampening means for preventing overtravel of the piston in response to sudden fluctuations in the forces acting upon the cylindrical gate valve 21. This arrangement thus permits the operation of the cylindrical gate valve 21 to be stabilized without the need of a follow-up arrangement.

The main valve or cylindrical gate valve 21, as explained, rides on the fixed concentric shaft 17 and has a predetermined clearance at its outside diameter. The above control mechanism is so arranged that at altitudes or predetermined atmospheric pressure ranges corresponding, for example, to standard atmospheric pressure at from sea level to 10,000 feet or any other suitable predetermined range, both bellows 35 and 46 are normally contracted and both valves 39 and 57 are held closed by their springs 40 and 60, respectively. The fixed jet 44, however, allows the pressure in the chamber 27 above the main valve control piston 22 to approach atmospheric, and, since there is cabin pressure in the chamber 24 below the main valve control piston, the main valve 21 will remain open with a small differential between the cabin and atmospheric pressure.

As the 10,000 foot point or any other predetermined altitude or predetermined atmospheric pressure is reached the evacuated bellows 35 has expanded due to lowering cabin pressure until it has started to open its valve 39. The differential pressure bellows 46, however, is still contracted and its valve 57 remains closed at this point of operation. Opening of the evacuated bellows valve 39, however, admits more or less air to the chamber 27 at the top of the main valve control piston 22. Thus, at altitudes from 10,000 to 18,000 feet for example or any other predetermined range, air is flowing from the cabin, through the evacuated bellows controlled valve 39 to the top of the main valve control piston 22 and through the fixed orifice 44 to atmosphere. Therefore, the pressure above the main valve control piston 22 and hence the position of the main valve 21 depends on the position of the evacuated bellows 35. Too much cabin pressure will tend to contract the evacuated bellows 35 and close its valve 39, cutting down the flow of cabin pressure air to the top of the main valve control piston 22. As a result, the pressure in chamber 27 above the main valve control piston 22 will tend to approach atmospheric; the main valve 21 will rise, allowing more air to flow from the cabin, thus lowering the cabin pressure to the desired point. The opposite reactions take place if cabin pressure is too low.

As the airplane climbs, the differential pressure bellows 46 approaches its valve 57, due to the increasing differential between cabin and atmosphere, and at about 18,000 feet or any other predetermined pressure range for which the same is calibrated it begins to open its valve 57. As the valve 57 opens, the evacuated bellows 35 opens its valve 39 in an attempt to maintain 10,000 feet cabin pressure and finally this reaches the full open position (slightly above 18,000 feet airplane altitude). From here on up the evacuated bellows controlled valve 39 is wide open and acts as a fixed orifice.

The differential bellows 46 now regulates the pressure above the piston 22 in a similar manner to the evacuated bellows 35. Too great a differential causes the bellows 35 to expand, opening its valve 39, and causing the main valve 21 to rise, thus lowering cabin pressure and decreasing the differential to the desired point.

This action is inherently stable in operation, and regulation takes place at any altitude or atmospheric pressure at flows as low as one-tenth of a pound per minute with complete absence from hunting.

One factor which contributes to the quality of the low flow operation of the present valve is the design of the main valve 21 itself. The use of the sharp edged tube 21 for closing, instead of a mushroom or other type has several distinct advantages.

First, in a valve which has a large surface parallel to the flow of air, instability is created by the Bernoulli action. As the valve closes, the flow rate increases, lowering the pressure on the valve surface, thus tending to close it still further. The present valve 21 avoids this condition since there is practically no surface for the lowered pressure to act upon due to the limited valve surface presented by the sharp edge 22.

Secondly, in the case of a "mushroom" type valve, as the same reaches the closed position, it will have the full differential of cabin and atmospheric pressure acting across its entire area to keep it closed. This requires a large force to "crack" open the valve, causing such a valve to jump open far past the desired point. The present valve 21 has the differential pressure of cabin and atmosphere, acting only across the thin annular area of the tube cross section which is practically negligible.

Third, the present valve 21 is designed to close at an acute angle to the valve seat 10. Thus, at low flows, when the valve is operating close to its seat, a given linear change in valve position gives less change in area, providing the proper sensitivity.

The seat itself has a nozzle contour which makes possible the short overall height of the unit. An expansion section is unnecessary with this type of nozzle, and it is only necessary to have a clear space on the atmosphere side of the valve.

In addition to the automatic control the present valve is equipped with a manual control which may be brought into operation at any time. This mechanism is probably best shown in Figures 7, 8 and 9 and includes a rod 64 having an operating knob 65 provided at one end thereof and an engaging hook 66 formed by leaf spring members 67 and 68 attached at the opposite end of the rod 64 for engaging a flange 69 formed on the main valve 21. The rod 64 is movable within a channel 70 formed in the casing 15 and passes through a locking member 71 positioned within the channel 70. The rod 64 may be held in adjusted position by adjusting a fastening nut 72 so as to tighten flanged portions 73 of the locking member 71 about the rod 64, thus holding the same in the adjusted position. The flange 73 is formed on the locking member 71 and is adapted to be engaged by the fastening nut 72, as indicated in Figure 8.

A channel 74 extends longitudinally in the rod 64 and there is engaged in the channel a portion 75 of a screw 76, which projects through the casing 15 into the channel 74. The channel 74 extends longitudinally in the rod 64 and has formed at the opposite ends thereof lateral channels 77 and 78 for receiving the part 75, whereby the rod 64 may be turned 180° from the flange 69 so as to disengage the flange 69.

Thus in order to operate the manual control the pilot loosens the knurled locking nut 72 and turns the control knob 65 180° from the position shown in Figure 7 and then adjusts the rod so as to engage the flange 69 as shown in Figure 8, after which he may raise or lower the valve 21 to any desired position. If he desires to lock the valve in a particular position it is only necessary to tighten the knurled locking nut 72. Disengagement is secured by retracting the rod 64 to the limit of movement and then turning the same 180° so as to disengage the flange 69 as viewed in Figure 7.

The valve may be installed as explained on any pressure wall or floor of the aircraft cabin and will operate in any position. Installation on a vertical wall will mean that the parts are less affected by accelerations although this effect will not be great in any case.

In Figure 6 there is shown a second form of my invention in which there is provided means for a constant pressure ratio control rather than constant pressure differential control. The arrangement shown in Figure 6 is otherwise substantially the same as that shown in Figure 5 and like numerals indicate like parts. However, instead of the spring 53 and cup-like member 51 as shown in Figure 5, there is provided an evacuated bellows 79 which is positioned concentric with the bellows 46 and surrounds the same as shown in Figure 6. The sealing plate 47 in the latter arrangement forms one end of the bellows 79 and a frusto pyramidal end plate 80 forms the opposite end of the bellows 79 and 46. From this arrangement it will be seen that the ratio of the areas of the two bellows 46 and 79 will determine the maximum pressure ratio at which the nut 55 will tend to open and close the valve 57 as previously described. Thus in the operation of the second form of my invention upon the plane climbing to the 18,000 foot level as previously described, or upon the same reaching the predetermined atmospheric pressure range for operation of the constant pressure ratio control, the evacuated bellows 35 will have opened the valve 39 to its full open position and the constant ratio control bellows arrangement 46 and 79 will tend to open the valve 57 upon the ratio between cabin pressure and atmospheric pressure exceeding a predetermined value causing an adjustment of such pressures to the desired point.

The advantage of the latter arrangement over the constant differential pressure control such as first described will be readily apparent when it is realized that at exceedingly high altitudes due to the rarified atmosphere encountered the capacity of the normal supercharger having capacity for lower altitude conditions will be insufficient to maintain the pressure within the cabin at a sufficiently high pressure to maintain the differential desired thereby causing adverse effects upon the supercharger mechanism. In order to avoid this condition the latter constant ratio control has been provided.

Although only two embodiments of the invention have been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. A mechanism to control aircraft cabin pressure, comprising, in combination, a cylindrical gate valve, a second cylinder surrounding said gate valve, a nozzle mounted at one end of said second cylinder, said second cylinder having openings to the cabin at the circumferental edge of the nozzle, said nozzle having an area normal to the airstream progressively decreasing from said circumferential edge so as to smoothly accelerate the air flow from said cabin, and said nozzle arranged as a valve seat for cooperating with one end of said cylindrical gate valve, said one end of said gate valve being formed with a substantially knife-like edge for contacting said nozzle, said valve including an air motor piston formed a part of said valve, said piston projecting laterally from said valve member and slidably mounted in the second cylinder, and air power means for operatively adjusting said piston so as to regulate said valve.

2. A mechanism to control aircraft cabin pressure, comprising, in combination, a main valve for regulating the pressure within said cabin, a cylinder having a fixed bleed orifice leading therefrom to atmosphere, an air motor piston operatively connected to said main valve and slidably mounted within said cylinder for controlling the movement of said main valve, said cylinder having an opening to cabin pressure, said opening and fixed bleed arranged so that said air motor piston has cabin pressure acting at one side thereof for opening said main valve and atmospheric static pressure acting at the opposite side through said fixed bleed orifice, spring means biasing said main valve in a direction opposing the force of said cabin pressure, whereby airflow through said fixed bleed orifice in response to movement of said air motor piston will tend to oppose movement of said main valve for effecting the stable control thereof, and control means for opening the aforesaid opposite side of said piston to cabin pressure in response to a cabin pressure in excess of a predetermined value.

3. A mechanism to control aircraft cabin pressure, comprising, in combination, a main valve for regulating the pressure within said cabin, a cylinder having a fixed bleed orifice leading therefrom, an air motor piston operatively connected to said main valve and slidably mounted within said cylinder for controlling the movement of said main valve, said air motor piston having cabin pressure acting at one side thereof for opening said main valve and atmospheric static pressure acting at the opposite side through said fixed bleed orifice, spring means biasing said main valve in a direction opposing the force of said cabin pressure, whereby airflow through said fixed bleed orifice in response to movement of said air motor piston will tend to oppose movement of said main valve for effecting the stable control thereof, an auxiliary control valve for opening the opposite side of said piston to cabin pressure, and cabin pressure responsive means for opening said auxiliary control valve at a predetermined minimum cabin pressure for causing said air motor piston to actuate said main valve in a valve closing direction.

4. A mechanism to control aircraft cabin pressure, comprising, in combination, a main valve for regulating the pressure within said cabin, a cylinder having a fixed bleed orifice leading therefrom, an air motor piston operatively connected to said main valve and slidably mounted within said cylinder for controlling the movement of said main valve, said air motor piston having cabin pressure acting at one side thereof for opening said main valve and atmospheric static pressure acting at the opposite side through said fixed bleed orifice, and spring means biasing said main valve in a direction opposing the force of said cabin pressure, whereby airflow through said fixed bleed orifice in response to movement of said air motor piston will tend to oppose movement of said main valve for effecting the stable control thereof, a first auxiliary control valve for opening the opposite side of said piston to cabin pressure, and cabin pressure responsive means for opening said first auxiliary control valve at a predetermined minimum cabin pressure for causing said air motor piston to actuate said main valve in a valve closing direction, and a second auxiliary control valve for opening said opposite side of said air motor piston to atmospheric pressure, and differential pressure responsive means for opening said second auxiliary control valve at a predetermined maximum difference between cabin and atmospheric pressures for causing said air motor piston to actuate said main valve in a valve opening direction for decreasing the said difference in pressures.

5. The combination, comprising, a cabin pressure control valve, a piston for operating said cabin pressure control valve, a chamber, said piston slidably mounted in said chamber, said piston open at one side to cabin pressure, a fixed jet for connecting said chamber to atmospheric pressure so as to apply atmospheric pressure to the other side of said piston, said chamber having an orifice opening said chamber to cabin pressure so as to apply cabin pressure to said other side of said piston, a valve controlling said orifice, and cabin pressure responsive means for regulating said valve in such a manner as to open said orifice in response to a cabin pressure in excess of a predetermined value for applying said cabin pressure so as to bias said piston in one direction, and spring tension means augmenting the biasing force applied to said piston in said one direction, and said cabin pressure exerting a force upon said one side of said piston for biasing said piston in an opposite direction upon application of atmospheric pressure to said other side, whereby regulation of said cabin pressure control valve may be effected by said cabin pressure responsive means.

6. A mechanism to control aircraft cabin pressure, comprising, in combination, a cylindrical gate valve, an annular nozzle, a casing surrounding said nozzle at its air inlet side, said casing having openings therein to the cabin at the circumferential edge of said nozzle, said nozzle having a surface area normal to the airstream progressively decreasing from said circumferential edge so as to form a cabin air outlet opening to smoothly accelerate the air flow from said cabin, said nozzle arranged as a valve seat for cooperating with one end of said cylindrical gate valve, said one end of said gate valve being formed with a substantially knife like edge for contacting said nozzle, and pressure responsive means for operatively adjusting said valve for controlling the outflow of air from the cabin.

7. A mechanism to control aircraft cabin pressure, comprising, in combination, a cylindrical gate valve, a second cylinder surrounding said gate valve, a piston formed integral with said valve and projecting laterally therefrom, said piston slidably mounted in said second cylinder for effecting movement of said gate valve, an annular nozzle positioned at one end of said second cylinder, said second cylinder having openings to the cabin at the circumferential edge of the nozzle, said nozzle having a surface area normal to the airstream progressively decreasing from said circumferential edge so as to form a cabin outlet opening to smoothly accelerate the air flow from the cabin, said nozzle arranged as a valve seat for cooperating with one end of said cylindrical gate valve, said one end of said gate valve having a substantially knife like edge for contacting said nozzle within the opening formed by the progressively decreasing surface area thereof, and cabin pressure responsive means for controlling the operation of said piston and the outflow of air from the cabin through said nozzle.

8. A mechanism to control aircraft cabin pressure, comprising, in combination, valve means including a valve seat, a hollow valve member open at opposite ends and longitudinally movable in relation to said valve seat, said valve means having an air outlet opening controlled by said valve member, one end of said valve member being formed with a substantially knife like edge to contact said valve seat, a piston formed integral with said valve member and projecting laterally therefrom, a chamber open at one end and within which said piston is slidably mounted, a spring acting solely upon said piston for biasing the valve member in a valve closing direction and in opposition to cabin pressure applied to one side of said piston through the open one end of said chamber, means for applying a variable fluid pressure to another side of said piston to augment the biasing force of said spring, and means for controlling the application of the variable fluid pressure to said piston.

9. The combination defined by claim 8 in which the last mentioned control means is responsive to cabin pressure.

10. The combination defined by claim 8 in which the last mentioned control means is responsive to changes in the difference between cabin and atmospheric pressures.

11. The combination defined by claim 8 in which the last mentioned control means is responsive to changes in a predetermined ratio between cabin and atmospheric pressures.

12. The combination defined by claim 8 in which the last mentioned control means includes first control means for regulating the application of the fluid pressure to said piston in response to cabin pressure, and second control means operative upon a predetermined differential between cabin and atmospheric pressures for controlling the application of the fluid pressure to said piston.

13. The combination defined by claim 8 in which the last mentioned control means includes first control means for regulating the application of the fluid pressure to said piston in response to cabin pressure, and second control means operative upon a predetermined ratio between cabin and atmospheric pressures for controlling the application of the fluid pressure to said piston.

WALTER D. TEAGUE, Jr.

REFERENCES CITED

The following references are of record in the file of this patent:

UNITED STATES PATENTS

| Number | Name | Date |
| --- | --- | --- |
| 616,724 | Noble | Dec. 27, 1898 |
| 1,562,663 | Strong | Nov. 24, 1925 |
| 1,575,725 | Stewart | Mar. 9, 1926 |
| 1,752,439 | Larner | Apr. 1, 1930 |
| 1,779,162 | Evers et al. | Oct. 21, 1930 |
| 2,208,554 | Price | July 16, 1940 |
| 2,276,371 | Cooper et al. | Mar. 17, 1942 |
| 2,284,984 | Nixon | June 2, 1942 |
| 2,307,199 | Cooper | Jan. 5, 1943 |
| 2,342,220 | Price | Feb. 22, 1944 |
| 2,391,197 | Schwein | Dec. 18, 1945 |
| 2,396,116 | Noxon | Mar. 5, 1946 |
| 2,413,027 | Maxson | Dec. 24, 1946 |
| 2,419,707 | Cooper et al. | Apr. 29, 1947 |

FOREIGN PATENTS

| Number | Country | Date |
| --- | --- | --- |
| 49,950 | Switzerland | Dec. 6, 1909 |
| 514,055 | France | Nov. 8, 1920 |
| 521,623 | Great Britain | May 27, 1940 |
| 766,771 | France | Apr. 23, 1934 |